US012645192B2

(12) United States Patent
Häring et al.

(10) Patent No.: US 12,645,192 B2
(45) Date of Patent: Jun. 2, 2026

(54) GENERATION OF MEASUREMENT STRATEGY FOR MEASURING A MEASUREMENT OBJECT

(71) Applicant: Carl Zeiss Industrielle Messtechnik GmbH, Oberkochen (DE)

(72) Inventors: Rolf Häring, Giengen (DE); Günter Haas, Aalen (DE); Herbert Bux, Lauchheim (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 0 days.

(21) Appl. No.: 17/236,731

(22) Filed: Apr. 21, 2021

(65) Prior Publication Data

US 2021/0333775 A1 Oct. 28, 2021

(30) Foreign Application Priority Data

Apr. 21, 2020 (EP) ..................................... 20170618

(51) Int. Cl.
    *G05B 19/401* (2006.01)
    *G01B 21/04* (2006.01)
(52) U.S. Cl.
    CPC ........... *G05B 19/401* (2013.01); *G01B 21/04* (2013.01); *G05B 2219/37443* (2013.01)
(58) Field of Classification Search
    CPC ........ G05B 19/401; G05B 2219/37443; G01B 21/04
    See application file for complete search history.

(56) References Cited

U.S. PATENT DOCUMENTS

| | | | | |
|---|---|---|---|---|
| 4,901,253 A | * | 2/1990 | Iwano | G05B 19/401 |
| | | | | 345/419 |
| 5,117,169 A | * | 5/1992 | Kakino | G05B 19/401 |
| | | | | 318/578 |

(Continued)

FOREIGN PATENT DOCUMENTS

| | | |
|---|---|---|
| CN | 110222101 A | 9/2019 |
| DE | 102015114715 A1 | 3/2017 |

(Continued)

OTHER PUBLICATIONS

EP-1330686-B1, Christoph, 2006, English Translation, downloaded from the Espacenet Sep. 19, 2022 (Year: 2006).*

(Continued)

*Primary Examiner* — Lina Cordero
*Assistant Examiner* — Lyudmila Zaykova-Feldman
(74) *Attorney, Agent, or Firm* — Miller Johnson

(57) ABSTRACT

A method for determining a measurement strategy for measuring a measurement object includes determining a test element of the measurement object. There is an automated test for the test element as to whether there is an applicable measurement rule in a measurement rule set of measurement rules defined in advance. An applicable measurement rule is added to a new measurement strategy or the test element-specific measurement rule of an existing measurement strategy is altered based on an applicable measurement rule. The measurement rules of the measurement rule set are determined by virtue of a measurement rule and at least one test criterion in respect of the applicability thereof being set for a test element by a user or in (partly) automated fashion. The measurement rule defines at least one parameter for measuring the test element.

26 Claims, 3 Drawing Sheets

(56)                 References Cited

U.S. PATENT DOCUMENTS

| | | | | |
|---|---|---|---|---|
| 5,465,221 | A  * | 11/1995 | Merat ..................... | G01B 5/008 |
| | | | | 706/904 |
| 8,539,429 | B1 | 9/2013 | Bickford | |
| 2001/0053962 | A1* | 12/2001 | Yoshida .............. | G03F 7/70616 |
| | | | | 702/123 |
| 2008/0295349 | A1* | 12/2008 | Uhl ...................... | G01B 21/047 |
| | | | | 33/503 |
| 2009/0300930 | A1* | 12/2009 | Ishikawa ................. | G01B 5/28 |
| | | | | 73/105 |
| 2010/0076717 | A1* | 3/2010 | Thiel ................. | G05B 19/4097 |
| | | | | 702/123 |
| 2010/0100199 | A1* | 4/2010 | Ruck .................. | G05B 19/0426 |
| | | | | 700/12 |
| 2015/0300798 | A1* | 10/2015 | Pettersson .............. | G01B 5/008 |
| | | | | 33/503 |
| 2017/0160066 | A1* | 6/2017 | Grupp .................... | G01B 21/04 |
| 2018/0045511 | A1* | 2/2018 | Georgi ................... | G01B 21/04 |
| 2019/0271529 | A1* | 9/2019 | Gruenewald ........ | G05B 19/401 |

FOREIGN PATENT DOCUMENTS

| | | | | | |
|---|---|---|---|---|---|
| EP | | 1330686 | B1 * | 12/2006 | .......... G05B 19/401 |
| WO | | 2002023292 | A2 | 3/2002 | |
| WO | WO-2017121468 | A1 * | 7/2017 | | ............. G01B 21/04 |

OTHER PUBLICATIONS

Kirin et al., Method and device for specifying specification data for a measurement of a workpiece etc., WO2017121468A1, 2016, English translation downloaded from Espacenet on May 20, 2023 (Year: 2016).*

Zeiss Academy Metrology, "Cookbook Measuring strategies for tactile Coordinate Metrology" Carl Zeiss AG, 2017.

AfM Technology Gmbh, "AfM GerberConvert," retrieved on Aug. 31, 2021, Web address <https:...www.afm-tec.info/afm-gerbertconvert>.

Elias GmbH, "infraConvert," retrieved on Mar. 9, 2021, Web address <https://wiki.elias-gmbh.de/doku.php?id=de: infraconvert: info>.

Wocke, P, "KMG automatisch Programmieren. Generierung, Visualisierung und Modifizierung von Antastpunkten und Verfahrwegen," F & M. Feinwerktechnik, Mikrotechnik, Messtechnik, Hanser, München, DE, vol. 102, No. 4, Apr. 1, 1994, pp. 181-186, ISSN: 0944-1018.

Chinese Examination Report for App. No. 202110433322.5, dated Oct. 25, 2023, 11 pages.

Extended European Search Report for EP20170618.1 dated Dec. 15, 2020, 24 pages.

* cited by examiner

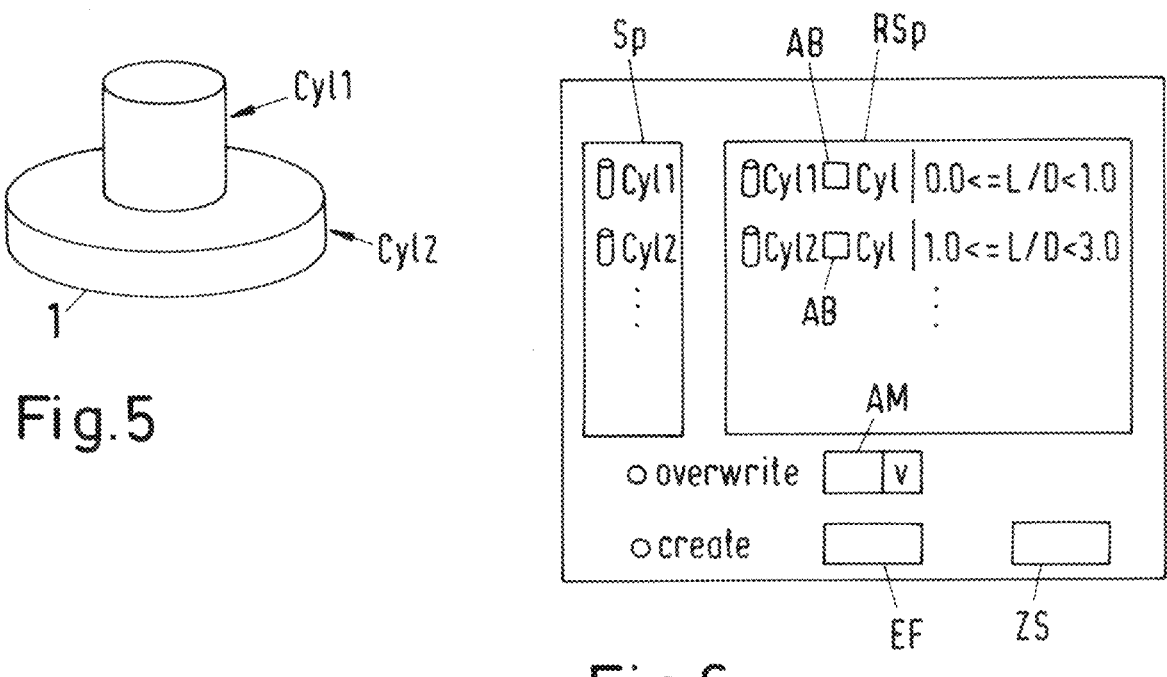
Fig.5
Fig.6
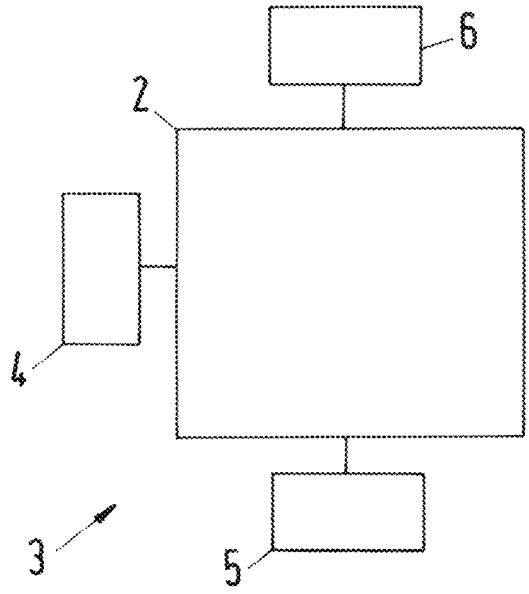
Fig.7

GENERATION OF MEASUREMENT STRATEGY FOR MEASURING A MEASUREMENT OBJECT

CROSS-REFERENCE TO RELATED APPLICATIONS

This application claims priority to EP 20 170 618.1 filed Apr. 21, 2020, the entire disclosure of which is incorporated by reference.

FIELD

The present disclosure relates to industrial metrology and more particularly to determining a measurement strategy for measuring a measurement object.

BACKGROUND

As a rule, a measurement strategy is defined for measuring a measurement object by means of a coordinate measuring machine. By way of example, said strategy defines what sensor is used for the measurement, what measurement trajectories are traversed, how many measurement points are generated along these measurement trajectories, how the generated measurement points are evaluated, what test elements of the measurement object are measured, and further necessary or desired parameters for the measurement and the evaluation.

As a rule, this determination of the measurement strategy was carried out by a user, who manually specified the appropriate parameters. The use of the "Zeiss Messstrategien Cookbook, publisher: Zeiss Academy Metrology, publishing house: Carl Zeiss AG, 2017" is likewise known. This cookbook contains suggestions for solving measurement problems, which a user can use for determining and defining the measurement strategy, with the latter then being defined by an appropriate input.

It is disadvantageous that the measurement strategies determined in this way depend on the user's experience and hence a measurement result is influenced by the user, which is generally undesirable. A further disadvantage is that, as a rule, manually defining the measurement strategy requires a lot of time.

The prior art has disclosed WO02/23292 A2, which describes a method for generating a measurement program for a coordinate measuring machine, in particular a multi-sensor coordinate measuring machine, wherein a target data record such as a CAD data record of an object to be measured is read into a data processing device that controls the coordinate measuring machine.

DE 10 2015 114 715 A1 discloses a method for creating a measurement program for determining geometric features and/or structures on a workpiece.

As of 13 Mar. 2020, the website found at https://wiki.e-lias-gmbh.de/doku.php?id=de:infra-convertinfo discloses the infra Convert software, by means of which test plans can be created in automated fashion.

As of 13 Mar. 2020, the website found at https://www.afm-tec.info/software-loesungen/afm-gerberconvert/ discloses that test plans for measuring electronic circuit boards can be generated fully automatically.

SUMMARY

The technical problem arising is that of developing a method and an apparatus for determining a measurement strategy for measuring a measurement object, and a program, which facilitate a quick determination, in terms of time, of reproducible and comparable measurement strategies which, in particular, can also retrospectively serve to alter already generated measurement strategies and which reduce the influence of the user on the measurement quality that is due to the measurement strategy.

The solution to the technical problem is provided by the subjects with the features of the independent claims. Further advantageous configurations of the invention are evident from the dependent claims.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In particular, the measurement object can be measured using a coordinate measuring machine. By way of example, such a coordinate measuring machine can have a column-type or bridge-type embodiment. However, coordinate measuring machines that differ therefrom can naturally also be used. In this case, it is conceivable for the measurement object to be measured in tactile fashion, i.e., by mechanical sensing using a so-called tactile sensor, and/or in optical fashion, i.e., by means of optical sensing by means of an optical sensor, by means of the measurement strategy. In this context, corresponding sensors and methods for measurement purposes are known to a person skilled in the art. In this context, the measurement strategy defines the measurement task and the parameters to be set for measurement purposes. In particular, the measurement strategy also defines which test elements of the measurement object are measured and how the measurement is carried out. The measurement strategy can also define the manner in which the measurement results are evaluated.

According to the proposed method, at least one test element of the measurement object is determined, in particular in a determination step. This test element can be determined, in particular, in model-based fashion, for example on the basis of a CAD model of the measurement object. Preferably, use can be made in this context of a CAD model with so-called PMI (production manufacturing information), which also encodes/comprises tolerance information items and information items in respect of test elements present in addition to the geometric information items of the measurement object. Naturally, it is also possible that test elements are identified and defined in (partly) automated fashion or by a user on the basis of a CAD model. Methods for (partly) automated identification and definition of test elements are known to a person skilled in the art in this context.

Alternatively, it is also possible to measure the measurement object, for example by means of the coordinate measuring machine for which the measurement strategy to be determined according to the invention is determined or by means of a further coordinate measuring machine that differs therefrom. By way of example, a three-dimensional representation of the measurement object can be generated by such a measurement. Hereinafter, the at least one test element of the measurement object can be determined in (partly) automated fashion or by a user on the basis of this three-dimensional representation. In this case, the measurement strategy for measuring the measurement object for generating the representation for the determination of test elements can differ from the measurement strategy to be determined as proposed.

In particular, a geometric element of the measurement object can be determined as a test element, with example geometric elements of the measurement object still being explained in more detail below.

Further, a test is carried out, in particular within a test step, as to whether there is a measurement rule applicable to the test element in a measurement rule set of measurement rules defined in advance. This test is carried out in automated fashion.

In this context, a measurement rule defines a parameter of the measurement of the test element, e.g., a speed of the relative movement between a sensor of the coordinate measuring machine and the measurement object when measuring in accordance with the measurement strategy, a number and/or a relative position of the measurement points to be generated, a number and/or relative position of the measurement trajectories to be traversed by the sensor, an angle range of the measurement and, possibly, further necessary or desired parameters of the measurement. Expressed differently, a measurement rule can define work instructions for encoding the implementation of the measurement of the test element, e.g., in the form of commands, the test parameters to be set for carrying this out and generating data, e.g., illumination parameters or probing forces, and the test components to be used for carrying out the test, e.g. sensors. Additionally, a measurement rule can contain parameters, which can be set or altered while the measurement is running, e.g., in order to adapt later (partial) test processes. Expressed differently, the measurement rule can contain/encode rules which directly or indirectly describe a desired course of the measurement for measuring the test element. Consequently, the measurement rule can be part of the measurement strategy if the former is integrated into the measurement strategy. The measurement rules of the measurement rule set defined in advance can be provided, for example, in the form of a database of measurement rules, with these being stored in retrievable fashion in a storage device, for example.

Further, at least one test criterion in respect of the applicability thereof can be assigned to each of the measurement rules stored in this way, wherein the test criterion and possibly parameters for testing the test criterion can likewise be stored in a manner assigned to the measurement rules, for example in the storage device. By way of example, this storage device can be a cloud-based storage device. However, this can naturally also be a local storage device. By way of example, a storage device can be a RAM or ROM memory.

Further, an applicable measurement rule is added to a new measurement strategy or the test element-specific measurement rule of an existing measurement strategy is altered on the basis of the applicable measurement rule if the measurement rule set contains such an applicable measurement rule for the test element. By way of example, an existing measurement rule of an existing measurement strategy can be replaced by the applicable measurement rule. In this case, addition or amendment can be implemented in fully automated or partly automated fashion, wherein the fully automated method requires no approval by a user, e.g., by a user input, and the partly automated method requests a user confirmation. By way of example, the test element-specific measurement rule to be applied can be suggested to a user within the scope of the partly automated method, for example by representing appropriate information items on a display device.

If no applicable measurement rule exists for a considered test element (hereinafter also referred to as selected test element) or if no applicable measurement rule is identified, a default measurement rule can be determined as applicable measurement rule for the test element. Alternatively, an applicable measurement rule may be determined based on at least one similar measurement rule of the existing measurement rule set. Further alternatively, an applicable measurement rule may be determined based on at least one property of a measurement scenario. Further alternatively, an applicable measurement rule may be determined by evaluating existing measurement rules. This determination of an applicable measurement rule can be performed in an automated or partly automated fashion.

If there is no applicable measurement rule in the measurement rule set, it can be tested, for example, whether a similar measurement rule exists in the measurement rule set. If no similar measurement rule can be identified, a default measurement rule can be determined as the applicable measurement rule. Alternatively, it can be tested whether an applicable measurement rule can be determined depending on at least one property of a measurement scenario or by evaluating existing measurement rules. If this is not the case, a default measurement rule can be determined as the applicable measurement rule.

Thus, by means of a default measurement rule, one or more of the parameters listed below can be set as follows:

a relative speed between sensor and measurement object to a value smaller than or equal to 5 mm/s, a number of measurement points to be generated per measurement trajectory to a value greater than or equal to 3600 or to a value such that, for a given cut-off wavelength (of e.g. 0.8 mm) of a filter for evaluation, the wavelengths smaller than this cut-off wavelength can be unambiguously determined in the evaluation of the filtered measurement points, a probing force to a value less than or equal to 100 mN, a length of a circular measurement trajectory to a value greater than the circumferential length of the circle, a number of measurement trajectories to be traversed to a value of one, the position of the measurement points to be generated in such a way that they are arranged equally distributed along the measurement trajectory, a position of the measurement trajectory to be traversed in such a way that it is arranged 5% or more of one dimension (length, width) of a test element, in particular a planar test element, away from the edge of the test element, the cut-off wavelength of a filter for filtering to a value of 0.8 mm, the type of a sensor as a tactile sensor, a diameter of a probing sphere of a tactile sensor to a value smaller than or equal to 2 mm, the number of measurement points to be generated in a predetermined time interval such that with a predetermined relative speed smaller than or equal to 5 mm/s along the measurement trajectory the number of measurement points to be generated per measurement trajectory (see above) is achieved.

An applicable measurement rule based on at least one similar existing measurement rule of the measurement rule set may be determined by evaluating a similarity measure between the selected test element for which no applicable measurement rule in the measurement rule set can be identified and the test elements to which existing measurement rules of the measurement rule set are assigned, wherein the applicable measurement rule is determined to be the measurement rule assigned to a test element for which the similarity measure is greater than a predetermined threshold or for which the similarity measure is greatest.

A similarity measure can be determined as a quantity that correlates negatively with a deviation between a predetermined target tolerance for the selected test element and a tolerance for a test element to which an existing measurement rule is assigned (the greater the deviation, the smaller the similarity measure). An example negatively correlated quantity is the reciprocal. The tolerance for a test element, to which an existing measurement rule is assigned, can be determined here depending on the parameters defined by this existing measurement rule, e.g. by a simulation, model-based or on the basis of a predetermined assignment between parameters and tolerance.

Also, a similarity measure can be determined as a quantity that negatively correlates with a deviation between at least one property or a quantity dependent on at least one property of the selected test element and a corresponding property/size of a test element to which an existing measurement rule is assigned. Such a property/quantity can be, for example, a property that is tested when the criterion for the applicability of the existing measurement rule is tested.

Of course, the similarity measure can also be determined as a quantity negatively correlated with a merged deviation between properties/sizes, where the merged deviation is determined as a function of the deviation between several, individual properties, for example as a sum or positively correlated. It is possible that individual properties are weighted with different weighting factors when determining the merged deviation.

Also, the similarity measure can be determined as a quantity negatively correlated to a merged deviation, where the merged deviation is determined as a function of the deviation between one or more properties and the explained tolerance deviation, for example as a sum or positively correlated.

An applicable measurement rule based on at least one property of a measurement scenario may be determined by determining a property of the measurement scenario and then determining a property-specific measurement rule as the applicable measurement rule. For example, a property of the measurement scenario may be: a quantity representing the type of sensor intended for measurement, a quantity representing a roughness of the measurement object or test element and/or a quantity representing the manufacturing process used to manufacture the measurement object or test element. The measurement scenario can be a test element specific or a measurement object specific measurement scenario. The property(ies) of the measurement scenario can be predetermined or predefined.

For example, a sensor type may be optical or tactile. A manufacturing process can in particular be a pre-forming, forming, separating, joining, coating or material property changing manufacturing process. In particular, a manufacturing process may be an additive or machining manufacturing process.

A property-specific measurement rule can be determined by evaluating, in particular in an automated or partly automated fashion, a predetermined assignment between different measurement scenarios with different properties and measurement rules assigned to these different measurement scenarios, with the measurement rule assigned to the measurement scenario whose properties deviate less than a predetermined amount from the properties of the measurement scenario for the selected test element or for which this deviation is minimal being determined as the applicable measurement rule for a selected test element. Such an assignment can in particular be stored in a storage device and evaluated by a suitable evaluation device.

An applicable measurement rule for a selected test element based on an evaluation of existing measurement rules can be determined by evaluating, in particular interpreting, existing measurement rules to determine a relationship between test elements and test element-specific applicable measurement rules, whereby the applicable measurement rule for the selected test element is then determined based on the relationship determined in this way. The existing measurement rules can in particular be the already existing measurement rules of the measurement rule set.

In particular, statistical methods of data evaluation can be applied to a data set to identify correlations, especially correlations between test elements and test element-specific applicable measurement rules. The data set can include information about different test elements, in particular also about at least one property of the different test elements, and about the measurement rules already defined for the different test elements. In particular, statistical characteristics may be determined and used to determine an applicable measurement rule. In particular, the statistical methods may include or employ a method for summarizing the data. Alternatively or cumulatively, data mining methods may be applied to identify a relationship between a test element or its characteristics and a measurement rule applicable to the test element, the relationship so identified then being used to determine an applicable measurement rule for a selected test element.

A model generated by machine learning can also be determined by evaluating existing measurement rules, whereby the applicable measurement rule for the test element is then determined based on the model determined in this way. In this context, the term machine learning includes or refers to methods for determining measurement rules based on training data. Thus, it is possible that a model is determined by methods for supervised learning that maps a relationship between a test element or its properties and a measurement rule applicable to the test element. Of course, it is also possible that the model represents a relationship between a test element or its properties and a measurement rule applicable to the test element as well as a criterion for its applicability.

Training data can include input and output variables. For example, input variables can be the test elements or properties of the test elements for which measurement rules and, if applicable, criteria for applicability have already been defined. Output variables can be the test element-specific measurement rules and, if applicable, criteria for applicability. Of course, it is also conceivable that unsupervised learning methods are used to determine the model.

Suitable mathematical algorithms for machine learning include: decision-tree-based methods, ensemble methods (e.g. boosting, random forest), regression-based methods, Bayesian methods (e.g. Bayesian belief networks), kernel methods (e.g. support vector machines), instance (e.g. k-nearest neighbor)-based methods, association rule learning-based methods, Boltzmann machine-based methods, artificial neural networks (e.g., perceptron)-based methods, deep learning (e.g., convolutional neural networks, stacked autoencoders)-based methods, dimensionality-reduction-based methods, regularization-based methods. It is also conceivable that rules are determined using a neural network. For example, the neural network may be an autoencoder or a convolutional neural network (CNN) or a recurrent neural network (RNN) or a long short-term memory network (LSTM) or a transformer neural network or a combination of at least two of the mentioned networks. It is also possible to use artificial intelligence methods to determine the rules. Such methods are known to the skilled person.

The applicable measurement rule determined in this way can be added to the new measurement strategy or the test element-specific measurement rule of the existing measurement strategy can be changed depending on the applicable measurement rule determined in this way. This results advantageously in a temporally fast determination of a measurement strategy, which ensures a high reproducibility and also reduces user influences on the measurement quality with this measurement strategy.

If no applicable measurement rule is identified for the test element in the measurement rule set, a predetermined default measurement rule can be added to the new measurement strategy or the test element-specific measurement rule of an existing measurement strategy can be altered to the default measurement rule. In particular, this default measurement rule can be a test feature type-specific or test feature group-specific default measurement rule and consequently be the same for all test elements of the same type or of the same group.

An automated determination of a measurement rule may denote a determination without user action, in particular without user input. In a semi-automated determination, for example, a data processing device may identify exactly one or more measurement rule(s) for a test element and suggest them to a user, e.g., via an information output device such as a display device through which corresponding information may be presented. The user may then select, e.g. by means of the input device, this measurement rule or one of these measurement rules, the selected measurement rule forming the applicable measurement rule.

According to the invention, the measurement rules of the measurement rule set are determined by virtue of a measurement rule and at least one test criterion in respect of the applicability thereof being set for a test element by a user or in (partly) automated fashion, wherein the measurement rule—as already explained above—defines at least one parameter for measuring the test element, in particular the mentioned relative speed, the number of measurement points and possibly further parameters.

By way of example, definable parameters of the measurement rule can be: a sensor parameter of a sensor of the coordinate measuring machine, a number of measurement points to be captured by the sensor during a predetermined time interval, a parameter of the spatial distribution of the measurement points to be captured, a speed of a relative movement between measurement object and sensor, a number of measurement trajectories, a length of a measurement trajectory, a filter parameter for filtering the measurement values, an evaluation parameter for evaluating the measurement values or a parameter for temperature compensation. A sensor parameter can be a probing parameter of a sensor of the coordinate measuring machine. In particular, a probing parameter can be a probing force and/or a probing orientation. A sensor parameter can also be or represent a focus value of an optical sensor of the coordinate measuring machine. A parameter of the measurement strategy can also be or represent a number of measurement points to be captured by the sensor within a predetermined time interval.

By way of example, this number per time interval can also be referred to as capture rate or scanning rate. Further, the at least one parameter can be or represent a parameter of the spatial distribution of the measurement points to be captured. Further, the at least one parameter can be or represent a (maximum) speed of a relative movement between measurement object and sensor of the coordinate measuring machine. This speed can also be referred to as scanning speed if there is a so-called scanning capture of measurement points, i.e., a capture of measurement points while a relative movement is being carried out. Further, the at least one parameter can be or represent a number of mutually different measurement trajectories for measuring the measurement object. Further, the at least one parameter can be or represent a length of a measurement trajectory of the overall length of all measurement trajectories.

Further, the at least one parameter can be or represent a filter parameter for filtering the measurement values. Further, the parameter can be or represent an evaluation parameter for evaluating the measurement values. Further, the parameter can be or represent a parameter of a method for temperature compensation.

Preferably, the parameter is or represents the speed, in particular the maximum or average speed, of the relative movement between measurement object and sensor and/or the number of measurement points to be captured during a predetermined time interval during the measurement by the measurement strategy.

In this context, a test criterion can be specified by virtue of, for example, specifying the type of test and at least one target variable for satisfying the test criterion. By way of example, a type of test can be a comparison, i.e., in particular a test whether an actual variable is less than, less than or equal to, equal to, greater than or equal to, or greater than the target variable. By way of example, the target variable can be a numerical value or a numerical value range. This is not mandatory, however. The target variable can also represent other features. Thus, for example, a target variable can be a certain sensor type, e.g., the "optical sensor" type, wherein a test is carried out, for example, whether or not the sensor defined for the measurement by the measurement strategy is an optical sensor.

In particular, a test criterion can be defined in such a way that, during a test of the test criterion, at least one property of the test element or one variable dependent on this property is evaluated, in particular, compared to a target variable. Thus, to determine whether or not the test criterion is satisfied, it is possible to evaluate at least one test element-specific property. Exemplary test element-specific properties are explained in greater detail below. A property of the test feature can also be referred to as test feature or the user input for the definition can be implemented by way of at least one input device in this context. By way of example, the latter can comprise suitable input means for the user input. Additionally, the input device can comprise a display device for representing a graphical representation of the measurement rule and information items for the applicable test criterion, or said input device can be connected to the latter. By way of example, said display device can be configured as a screen. By way of the display device, it is possible, for example, to display a graphic representation of information items relating to the test element, to the test criterion (e.g., the type of test and the target variable) of the property of the test element to be tested and to the parameter of the measurement rule to be defined. If, as explained in more detail below, at least two test criteria are defined for a test element for the purposes of determining the measurement rule, these can likewise be represented in suitable fashion by the display device. By way of example, information items in respect of a subsequent test criterion can be presented in indented fashion in relation to the information items of a preceding test criterion. Additionally, other information items in respect to different target variables, which are assigned to a property of the test element, can be presented in relation to this property in indented fashion.

Alternatively or cumulatively to adding the applicable measurement rule for a selected test element for which no applicable measurement rule exists or is identified as explained above to the measurement strategy or to changing the existing measurement strategy, it is also possible that the applicable measurement rule determined in this way is added to the measurement rule set. In this case, in addition to the applicable measurement rule, at least one test criterion is determined for its applicability. The determination of the test criterion can also be automated or partly automated. Thus, an automated or partly automated determination of a measurement rule and at least one test criterion for its applicability can be performed by determining—as explained above—an applicable measurement rule and also a criterion for the applicability of this measurement rule. In this case, an automatic formation of the measurement rule set takes place in an advantageous way, which subsequently enables a temporally fast determination of reproducible and comparable measurement strategies and also reduces user influences on the measurement quality.

For the automatic built-up of the measurement rule set, it is not absolutely necessary that a selected test element is determined as a test element of a measurement object. It is also conceivable to create a selected test element by changing one or more properties of test elements, to which already existing measurement rules are assigned, in a predetermined way. In this way, one or more measurement object-independent test elements, which can also be referred to as simulated test elements, can be generated, in which case an applicable measurement rule and at least one criterion for its applicability are determined for each of these and added to the measurement rule set. This can also be referred to as a measurement object-independent built-up of the measurement rule set. However, such a measurement object-independent built-up may require already existing measurement rule sets or at least existing measurement rules that are assigned to test elements. A test element can be assigned to a measurement rule if the at least one test criterion for its applicability is fulfilled for the test element.

For a selected test element for which no measurement rule can be identified in the measurement rule set, a test criterion can be determined, in particular in an automated or partly automated fashion, in the same way as an applicable measurement rule.

If the applicable measurement rule for the selected test element is determined as a default measurement rule, the test criterion can be determined as a default criterion. Such a criterion can be fulfilled, for example, if a deviation of one, selected or all property(ies) of the selected test element is smaller than a predetermined amount.

If an applicable measurement rule is determined based on at least one similar existing measurement rule of the measurement rule set, the test criterion associated with that similar measurement rule can be determined as the test criterion.

If an applicable measurement rule is determined based on at least one property of a measurement scenario, a predetermined assignment between different measurement scenarios with different properties and test criteria assigned to these different measurement scenarios can be evaluated, in particular in an automated or partly automated fashion, whereby the test criterion assigned to the measurement scenario whose properties deviate less than a predetermined amount from the properties of the measurement scenario for the selected test element is then determined as the test criterion, or for which this deviation is minimal. Such an assignment can, in particular, be stored in a memory device and evaluated by a suitable evaluation device. It is also possible that—as explained above—the measurement rule is determined based on at least one property of a measurement scenario and this measurement rule is assigned at least one test criterion for its applicability, which is then determined as an applicable test criterion.

If the applicable measurement rule for the selected test element is determined based on an evaluation of existing measurement rules, a relationship between test elements and test element-specific applicable measurement rules as well as criteria for their applicability can be determined, whereby the applicable measurement rule and at least one criterion for its applicability for the test element is then determined based on the relationship determined in this way. For this purpose, the evaluated data set can comprise information about different test elements, in particular also about at least one property of the different test elements, and about the measurement rules already determined for the different test elements as well as about the criteria for their applicability. In this case, a relationship between a test element or its properties and a measurement rule applicable to the test element as well as at least one criterion for its applicability can be identified, the relationship thus identified then being used to determine the measurement rule and the criterion for its applicability. As previously explained, the relationship may be determined in the form of a model generated by machine learning.

If the measurement rule and the test criterion are defined in partly automated fashion, a data processing device, for example, can identify, and propose to a user, exactly one or more test criteria and measurement rule(s) for a test element. By way of example, this can be implemented by presenting corresponding information items on the aforementioned display device. Then, the user can select this measurement rule or one of these measurement rules and one or more test criteria in respect of the applicability thereof, for example by means of the input device. In this context, the data processing device can implement the corresponding identification by evaluating the measurement rules/test criteria, known in advance, for measuring test elements known in advance. Test elements known in advance and measurement rules/test criteria assigned thereto can likewise be stored in a database, for example.

By way of example, the identification can be implemented by virtue of the data processing device determining a similarity measure between a test element of the measurement object and a test element known in advance, which has assigned a measurement rule and at least one test criterion in respect of the applicability thereof, and assigning the measurement rule and the at least one test criterion to the test element of the measurement object if the similarity measure is higher than a predetermined amount. However, naturally, other embodiments for (partly) automated identification of measurement rules and at least one test criterion in respect of the applicability thereof are also conceivable.

When the measurement rule and the at least one test criteria in respect of the applicability thereof is defined fully automatically, a data processing device can likewise identify a suitable measurement rule—as explained above—and then add the latter to the new measurement strategy or alter the already existing test element-specific measurement rule of an existing measurement strategy. Alternatively or in addition, a suitable, applicable measurement rule and a criterium in respect of the applicability thereof can be identified—as outlined above- and added to the measurement rule set.

In this context, a data processing device can also be referred to as a computing device and be embodied as, or comprise, a microcontroller or integrated circuit.

By way of example, a method for (partly) automated determination and definition can be a self-learning method. By way of example, it can be configured in such a way that a measurement rule defined by means of the method is added to the aforementioned set of measurement rules known in advance, which are assigned to a test element, and is then available for a subsequent (partly) automated determination and definition.

In this context, defining a measurement rule and the at least one test criterion in respect of its applicability together facilitates, in terms of time, a quick determination/generation of a measurement strategy in a technically advantageous manner, leading to reproducible and comparable measurement results in the case of the same measurement objects, similar measurement objects (e.g., measurement objects of a batch) or different measurement objects since the same measurement rule set is resorted to for the purposes of determining the respective measurement object-specific measurement strategy, said measurement rule set also containing a test criterion in respect of the applicability of the corresponding measurement rule in addition to the definition of the parameters for the measurement. Consequently, it is possible to ensure that the same measurement rules are used for the same test elements or test elements with the same properties.

Further, different measurement rules can be defined for different properties of the test element. By way of example, different speeds of the relative movement between sensor and measurement object and/or different numbers of measurement points and/or different angle ranges to be measured can be defined for different diameters of a cylinder.

In particular, a user no longer needs to define measurement rule parameters and criteria for applying this measurement rule individually and independently of one another for an identified test element of the measurement object. Further, the measurement can be adapted to properties of the test element in a desired and reproducible manner as a result of the manner of the common definition, wherein, as a result of this, it is possible to generate the aforementioned reproducible and comparable measurement results when measuring a measurement object.

Likewise, consequently, there may be a standardization of measurement methods. Further, a very fast creation of measurement strategies is facilitated, with these possibly also being user specific. As a result of creating the rule, it is also possible for existing experiences to be included in the determination of the measurement strategy. Available measurement strategies can be easily modified, in particular optimized.

In the case where an applicable measurement rule alters an already existing test element-specific measurement rule, for example replaces the latter, this likewise yields the aforementioned provision of a reproducible and comparable measurement strategy for a measurement object, within the scope of which the user influences on the measurement quality are reduced.

In a further embodiment, a test criterion is defined in such a way that at least one geometric property of the test element or a variable dependent thereon is evaluated during a test of the test criterion. As explained above, this geometric property can be determined for the test element of the measurement object, for example in model-based fashion or by way of a measurement. Exemplary geometric properties are explained in even greater detail below. This advantageously yields a particularly good adaptation of the parameters for the measurement (which are defined by the measurement rule) to expected geometric properties of the test element on the real measurement object, which should be measured by means of the measurement strategy to be determined as proposed. This adaptation advantageously facilitates a high measurement quality being attained.

Alternatively or cumulatively, the test criterion is defined in such a way that an ambient condition is evaluated. An ambient condition can be, for example, a temperature, a humidity, an illumination parameter such as, e.g., a luminous intensity, or a further ambient parameter. By way of example, the test criterion can be defined in such a way that a certain measurement rule is applied if an ambient temperature corresponds to a predetermined temperature or lies in a predetermined temperature range. This advantageously yields a particularly good adaptation of the parameters for the measurement to ambient conditions and hence likewise yields an improvement in the measurement quality of the measurement by means of the measurement strategy to be determined as proposed.

Further alternatively or cumulatively, the test criterion is defined in such a way that a predetermined tolerance of the test element is evaluated. Tolerance information items can be determined in model-based fashion, for example from a CAD model with PMI. By way of example, different parameters for the measurement of the test element can be used for greater tolerances than in the case of comparatively smaller tolerances, with, however, it being possible to ensure the same measurement quality. Advantageously, a measurement time required to measure by means of the measurement strategy to be determined as proposed is reduced as a result thereof.

Further alternatively or cumulatively, the test criterion is defined in such a way that a measuring device type and/or a sensor type and/or a build state of the measurement object and/or a measurement quality of a preceding measurement is evaluated, wherein the preceding measurement was carried out, for example, in accordance with a measurement strategy that was determined as proposed in this disclosure. This is illustrated in even more detail below. This advantageously yields a particularly good adaptation of the measurement rule, and hence also of the measurement quality to be attained, to the measuring device type and/or the sensor type and/or the build state of the measurement object and/or a measurement quality of an existing measurement strategy, which can then be altered. Advantages of the measurement quality-dependent adaptation will still be explained in more detail below.

Taking account of the build state advantageously allows a reduction in measurement time since, e.g., measurement objects in a pre-completion state need not be measured with the same (high) measurement quality as measurement objects in a completed state.

In a further embodiment, at least one geometric property of the test element or a variable dependent thereon is determined for testing an applicability of the measurement rule, in particular for the above-described automated test. This can be implemented—as likewise already explained above—on the basis of model or on the basis of a measurement of the measurement object. An ambient condition is determined alternatively or cumulatively. By way of example, a temperature can be determined by at least one temperature sensor, with this temperature sensor being able to be data-connected to the data processing device for the automated test of the applicability, for example via a bus system.

Further alternatively or cumulatively, a predetermined tolerance is determined, for example in model-based fashion. Further alternatively or cumulatively, a measuring device type and/or a sensor type and/or a build state of the measurement object is determined and/or a measurement quality of an existing measurement strategy is determined. To determine the measuring device type and/or the sensor type, the data processing device for implementing the automated test of the applicability can be connected to a corresponding control and/or evaluation device of the measuring device or of the sensor and can query corresponding type information items. Naturally, it is also possible for a user to input the measuring device type and/or the sensor type by way of a user input. By way of example, the build state of the measurement object can be determined on the basis of further process parameters or can be input by a user.

The measurement quality can be determined using methods for determining the measurement quality known to a person skilled in the art. Exemplary methods will still be explained below. To determine the measurement quality, the measurement object can be measured, in particular using a measurement strategy determined as proposed, with it then being possible for measurement rules of this measurement strategy to be altered depending on the measurement quality.

Overall, all parameters required to test whether an applicable measurement rule exists can be determined or captured. Additionally, a user can be prompted to input the corresponding parameters, for example by a corresponding representation of the prompt on the display device explained above.

This advantageously yields the good adaptation of the measurement rule, and hence of the measurement strategy, to geometric properties, ambient conditions, tolerances, a measuring device type, a sensor type and/or a build state, as already explained above, as a result of which the measurement strategy to be determined as proposed can achieve a high measurement quality and/or a quick measurement in terms of time.

What arises furthermore is that the reproducibility of the measurement results, too, is increased and user influences when determining the measurement strategy are further reduced since different measurement rules can be defined for different ambient conditions, tolerances, measuring device types, sensor types and/or built states, which are then, however, defined in user independent fashion or with reduced user dependence in the method according to the invention.

In a further embodiment, test element-specific properties are respectively assigned to different test elements, wherein a test criterion is defined for a test element in such a way that only at least one test element-specific property of the test element or the variable dependent thereon is evaluated during a test of the test criterion. Expressed differently, what is ensured is that only admissible properties for determining an applicable measurement rule are evaluated for a test element. In this context, different test elements can have different test element-specific properties.

By way of example, if different criteria are proposed or offered for selection to a user when defining a measurement rule and the associated test criterion in respect of the applicability thereof, the proposition or offer can be restricted to those test criteria which only require test element-specific properties of the test element for evaluation purposes. In particular, a user may not be offered or may not have been proposed to them a test criterion which requires a property for evaluation purposes which the test element does not have. This advantageously increases quality of the measurement strategy to be determined, with user influences being reduced further.

In this context, an assignment of test element-specific properties to test element may be known in advance and, for example, be stored in retrievable fashion in the form of a database in a corresponding storage device. By way of example, this can ensure that a test criterion evaluating the width quantity is not applied to a cylindrical test element since the evaluation of only test element-specific properties can already be ensured when defining the measurement rule for a test element. This also ensures that in fact only present, test element-specific properties are evaluated during the automated test of the applicability of measurement rules, as a result of which the time for determining the measurement strategy is advantageously reduced since there is no need to provide for measures for treating an evaluation of properties which the test element does not have.

In a further embodiment, at least two test criteria, which should be tested in at least two successive test steps, are defined for testing the applicability of a measurement rule for a test element. By way of example, different test element-specific properties of the test element can be tested in successive test steps. It is also possible for the same test element-specific property to be tested in respect of different target variables in successive test steps. This advantageously yields a particularly good adaptation of a measurement rule to a test element and hence a high measurement quality when measuring with the measurement strategy to be determined as proposed.

If the measurement rules arising in various test steps collide, for example because they are defined by different values of the same parameter, it is possible to carry out suitable measures for collision avoidance. By way of example, in such a case, the measurement rule can be added to the new measurement strategy or can be used to alter an existing measurement strategy, which arose in the test step carried out first or last.

By way of example, that a capture of measurement points should be implemented along 5 uniformly distributed trajectories can be defined as a measurement rule for a test feature, with the test criterion for application of this measurement rule being defined in such a way that the measurement rule is applied if the geometric shape of the test feature is a cylinder shape. By way of example, this test criterion can be evaluated in a first test step.

That a capture of measurement points should be implemented along 3 uniformly distributed trajectories can be defined as a further measurement rule for a test feature, with the test criterion for application of this measurement rule being defined in such a way that the measurement rule is applied if the diameter of the test feature property is intended to be evaluated. By way of example, this test criterion can be evaluated in a further test step, which is carried out after the first test step.

If, for example, a cylinder is selected as test feature, the latter has the cylinder shape test feature and also the diameter test feature. If both properties are evaluated in the aforementioned test steps, the measurement rule is added to the new measurement strategy or used to alter an existing measurement strategy, which arises, for example, in the first test step, with 5 uniformly distributed measurement trajectories then being generated for the cylinder.

In a preferred embodiment, the test criterion to be tested in a subsequent test step is defined on the basis of at least one already tested test criterion. By way of example, the test criterion to be tested in the subsequent test step can be defined in such a way that no property of the test element which was already evaluated in a preceding test step or which was already taken into account during the evaluation is evaluated during the test. Expressed differently, the criterion to be tested can be defined in a subsequent test step in such a way that no inadmissible property is taken into account for evaluation purposes, wherein an inadmissible property can be determined on the basis of a predetermined assignment between at least one already tested property and at least one inadmissible property.

By way of example, this can ensure that a test of the diameter quantity (property of the test element) is not defined as a test criterion if a length and a ratio of length to diameter were evaluated in preceding test steps. In this case, the predetermined assignment can be specified by a user, for example, and can be stored in retrievable fashion in a storage device, for example in the form of a database.

Alternatively or cumulatively, the test criterion to be tested in a subsequent test step is defined on the basis of a result of the test of at least one already tested test criterion. By way of example, different properties to be tested, which should be tested in a subsequent test step, can be defined for different results of the test. Additionally, for different results, different target variables can be defined for the test in the subsequent test step. By way of example, if the length of a cylinder is determined to be smaller than the diameter of the cylinder in a preceding test step, a test can be carried out in a subsequent test step as to whether the diameter is less than a first predetermined value or less than a second predetermined value. However, if the length is greater than or equal to the diameter, a test can be carried out in a subsequent test step whether, for example, the diameter is smaller than a third predetermined value or smaller than a fourth predetermined value, with the first, second, third and fourth value each being different from one another.

By way of example, the criterion to be tested can be defined in a subsequent test step in such a way that no inadmissible property is taken into account for evaluation purposes, wherein an inadmissible property can be determined on the basis of a predetermined assignment between the result of the test of an already tested test criterion and at least one inadmissible property.

In particular, ensuring the proposed type of definition can be implemented by virtue of only those test criteria which ensure that the aforementioned dependence on already tested test criteria is satisfied being offered to, or suggested for selection by, a user during the definition, for example by the above-described data processing device. By way of example, there might be no suggestion to the user of defining a diameter variable-dependent test criterion in the aforementioned example.

Further, it is also conceivable that the measurement rule, in particular the values of a parameter for measuring the test element, is defined on the basis of at least one already tested test criterion and/or on the basis of a result of the test of at least one already tested test criterion. In particular, definable values of a parameter for the measurement can be dependent on at least one already tested test criterion and/or dependent on a result of the test of at least one already tested test criterion. By way of example, it is conceivable that only those measurement rules for definition purposes which are admissible measurement rules are offered to, or proposed for selection by, a user, wherein admissible measurement rules are determined on the basis of an assignment, known in advance, of admissible measurement rules to a result of the test of at least one already tested test criterion and/or an assignment, known in advance, of admissible measurement rules to an already tested test criterion. This assignment, known in advance, can also be stored in retrievable fashion, for example in the form of a database, and can be evaluated for proposals or offers, for example by means of the aforementioned data processing device. This can advantageously ensure that no inadmissible measurement parameters are defined for use in the measurement strategy or that no measurement parameters that lead to a reduced measurement quality are defined.

In a further embodiment, a test element is a cylinder shape, a circle shape, a cone shape, a sphere shape, a torus shape, a two-dimensional straight line, a slot, a plane, a plane of symmetry or a rectangle shape. In particular, the test element can therefore be an element with one of the above-described shapes of the measurement object. Advantageously, this yields a simple assignment of properties to be tested and hence a reliable test of the measurement object by means of the measurement strategy to be determined.

In a further embodiment, a property of a test element is a diameter variable, a further diameter variable, a length variable, a width variable, a ratio of length to diameter, a ratio of length to width, a distance variable, an angle variable, an internal or external identifier, the membership of a test feature group or the membership of a test feature type.

As mentioned above, it is possible for a test element in this context to not have all of the aforementioned properties. Thus, the property of the further diameter variable might only be present in those test elements that have two distinguishable diameter variables, for example a torus.

Further, a diameter variable as property to be tested may only be admissible for the test elements of circle shape, cylinder shape, cone shape, sphere shape or torus. Further, a length variable as property to be tested may only be admissible for the test elements of cylinder shape, cone shape, 2D straight line, slot, plane, plane of symmetry or rectangle shape. Further, a width variable as property to be tested may only be admissible for the test elements of slot, plane, plane of symmetry or rectangle shape. Further, the ratio of length to diameter as a property to be tested may only be admissible for the test elements of cylinder shape and cone shape. Further, the ratio of length to width as a property to be tested may only be admissible for the test elements of slot, plane, plane of symmetry or rectangle shape. Further, a distance variable as property to be tested may only be admissible for the test element of plane of symmetry. Further, a variable of the cone angle as property to be tested may only be admissible for the test element of cone shape. Further, the internal identifier/external identifier as property to be tested may only be admissible for the test elements of circle shape, cylinder shape, cone shape, slot, plane of symmetry, sphere shape, torus or rectangle shape.

An internal identifier is a property which an element such as a bore, for example, has. An external identifier is a property which an element such as a shaft, for example, has. Thus, for example, both a bore and a shaft can be classified as a cylinder shape, wherein, however, the bore has an internal identifier as a property and the shaft has an external identifier as a property and different rules should be applied to measure the bore and the shaft, in particular on account of the accessibility of an element with an internal identifier, for example by means of a tactile sensor, generally being more difficult in comparison to an element with external identifier.

In this context, the test elements can be categorized in test feature groups. By way of example, a test element can belong to a test feature group if at least one or else more or else all of the following conditions are satisfied: shape condition, position condition, variable condition, reference condition. The shape condition can be satisfied if the test element has one or more of the properties explained below: roundness, roundness in a certain angle range, waviness, planarity, planarity in relation to a further test element, straightness, straightness in relation to a further test element, cylinder shape, shape, curve shape, surface shape, line shape.

A position condition can be satisfied if the test element has at least one of the following properties: ascertainable or measurable position, being coaxial with a predetermined reference axis, being concentric, being perpendicular, being parallel to a specified reference, symmetry with respect to a predetermined reference, inclination and further properties.

The variable condition can be satisfied if the test element has at least one of the measurable properties listed below: diameter, radius, length, width, cone angle, half cone angle, perpendicular length, distance from a symmetry plane, point distance.

The reference condition can be satisfied if the test element has the property of a reference element for at least one coordinate direction for a surface shape, a line shape, a position or a coaxial property.

If none of the aforementioned conditions are satisfied, the test element can be classified as belonging to a residual group.

The group membership can be tested in a test criterion, wherein it is also possible in that case to define a group membership-specific measurement rule.

A test element can also be assigned to a test feature type or can be categorized as a test feature type. By way of example, a test element can be assigned to a test feature type if the test element has at least one of the measurable properties explained below: roundness, waviness, planarity, straightness, cylinder shape, curve shape, inclination. Naturally, other properties are also conceivable.

A person skilled in the art can gather further properties for satisfying the shape condition, the position condition, the variable condition and the reference condition from relevant standards, for example the standard DIN EN ISO 1101, edition 2017-9.

If the test element has none of these properties, it can be assigned to the residual test feature type.

The type membership can be tested in a test criterion, wherein it is also possible in that case to define a type membership-specific measurement rule.

As a result, the creation of a measurement strategy of the measurement with properties of test features that are measurable to the best possible extent advantageously arises, as a result of which the measurement quality of the measurement carried out in accordance with the measurement strategy to be determined is advantageously increased.

In a further embodiment, the test as to whether there is an applicable measurement rule in the measurement rule set is carried out on the basis of at least two different properties of the test element, with the different properties being tested sequentially. In this respect, reference can be made to the explanation in respect of defining measurement rules and the test criteria, assigned to a measurement rule, in respect of the application thereof. Advantageously, this yields a test that is quick in terms of time and easy to realize, in respect of whether there is an applicable measurement rule in the measurement rule set, wherein the measurement rules of the measurement rule set are defined as explained above.

In a further embodiment, the property to be tested/properties to be tested in a subsequent test step is/are determined on the basis of at least one already tested property and/or on the basis of a result of the test of at least one already tested property. In this respect, it is likewise possible to refer to the explanations in respect of defining measurement rules and test criteria to be tested in respect of the applicability thereof.

By way of example, it is possible that no diameter variable is determinable as property to be tested for a test element, in particular a cylinder or a cone, if the length variable or the ratio of length to diameter has already been tested as a property. Further, it is possible that no length variable is determinable as property to be tested for a test element, in particular a cylinder or a cone, if the diameter variable or the ratio of length to diameter has already been tested as a property. Further, it is possible that no length variable is determinable as property to be tested for a test element, in particular a plane, a plane of symmetry or a rectangle, if the width variable or the ratio of length to width has already been tested as a property. Further, it is possible that no width variable is determinable as property to be tested for a test element, in particular a plane, a plane of symmetry or a rectangle, if the length variable or the ratio of length to width has already been tested as a property. Further, it is possible that no ratio of length to diameter is determinable as property to be tested for a test element, in particular a cylinder or a cone, if the diameter variable or the length variable has already been tested as a property. Further, it is possible that no ratio of length to width is determinable as property to be tested for a test element, in particular a plane, a plane of symmetry or a rectangle, if the length variable or the width variable has already been tested as a property.

Accordingly, it is also possible to define the measurement rules and the test criteria to be evaluated in respect of the applicability thereof.

This advantageously accelerates the determination of a measurement strategy since the measurement rule set can be tested quickly in terms of time for applicable measurement rules.

In a further embodiment, a test element is determined in model-based fashion. Alternatively, the measurement object is measured and the test element is determined by evaluating the measurement results. This and corresponding advantages have already been illustrated above.

In a further embodiment, the measurement object is measured in accordance with the new or altered measurement strategy and a measurement quality of the measurement is determined. At least one test element of the measurement object is determined in order to determine a measurement strategy that has been altered yet again. Further—as explained above—there is an automated test for the test element as to whether an applicable measurement rule exists in a measurement rule set of measurement rules defined in advance, wherein the test element-specific measurement rule of the new or altered measurement strategy is altered if this measurement rule is applicable to the test element, with the test being implemented on the basis of the measurement quality.

By way of example, a test criterion can be defined in such a way that a test is carried out as to whether the measurement quality is greater than a predetermined target minimum measurement quality, in particular more than a predetermined amount. If this is the case, the corresponding measurement rule can be defined in such a way that the time required to measure the measurement object in accordance with the once again altered measurement strategy and/or the computational outlay required to measure the measurement object in accordance with the once again altered measurement strategy and/or the data storage capacity required to measure the measurement object in accordance with the once again altered measurement strategy is reduced in comparison with the previous measurement strategy. In particular, the measurement rule can be defined in such a way that the measurement quality reduces. Defining the measurement rule can be implemented by virtue of at least one definable parameter being defined, e.g., by quantification.

In particular, this embodiment allows the measurement strategy to be altered dynamically during the measurement, in particular during a measurement procedure or following a measurement procedure. Advantageously, this allows the measurement method, which is defined by the measurement strategy, to be adapted to the measurement object and its production quality. Furthermore, adapting to the coordinate measuring machine and the sensor system employed is also facilitated. Additionally, a faster measurement of the measurement object in terms of time can be advantageously achieved using this embodiment, as a result of which the process duration of a process, in which the measurement is incorporated, for example a quality test, is also reduced. If the measurement requires less computational outlay, it is advantageously possible to utilize less powerful elements, in particular computing devices, which are used to generate and/or evaluate the measurement points. Since, as a rule, these are cheaper and also require less installation space, it is consequently possible to achieve a reduction in production costs and, possibly, a reduction in the installation space required by the coordinate measuring machine. Additionally, the reduction in the computational outlay advantageously contributes to a faster measurement in terms of time, i.e., a shorter measurement time. Similar statements apply to the reduction in the data storage capacity, by means of which similar advantages can be obtained as in the reduction of the computational outlay.

By way of example, a measurement quality parameter representing the measurement quality can be determined as measurement quality. The measurement quality parameter can be, for example, a relationship between the measurement uncertainty and a manufacturing tolerance known in advance. Additionally, a variable that represents the accuracy, repeatability, reproducibility, linearity and/or stability of the measurement in accordance with the measurement strategy can be determined as measurement quality. To determine a variable representing the measurement quality, it is possible to carry out a GR&R test or a test pursuant to VDA volume 5.

It is naturally also possible for a test criterion to be defined in such a way that a test is carried out as to whether the measurement quality is less than a predetermined target minimum measurement quality. If this is the case, the corresponding measurement rule can be defined in such a way that the measurement quality for measuring the measurement object in accordance with the once again altered measurement strategy is expected to increase, in particular the time required for measurement in accordance with the once again altered measurement strategy and/or the computational outlay required to measure the measurement object in accordance with the once again altered measurement strategy and/or the data storage capacity required to measure the measurement object in accordance with the once again altered measurement strategy is increased in comparison with the previous measurement strategy. To this end, it is also possible to estimate the corresponding effect of the change on the measurement quality, for example on the basis of a relationship, known in advance, between the change and the effect. Further, it is possible to define that there is no change in the measurement rule if the measurement quality equals the predetermined target minimum measurement quality or is no greater than the latter by more than the predetermined amount.

It is further possible for the measurement strategy that is determined as proposed to be tested in automated fashion, in particular the created measurement rules in respect of applicability. By way of example, it is possible to test whether a state occurs using the measurement rules of the measurement strategy, in which state there is no contact between a tactile sensor and the measurement object even though there should actually be contact with the measurement object A problematic state can be indicated to a user by displaying a warning symbol. It is likewise possible to indicate information items in respect of the problematic state.

Further proposed is an apparatus for determining a measurement strategy for measuring a measurement object, wherein the apparatus comprises at least one data processing device. In this context, this data processing device can be a computer or part of a computer. Further, at least one test element of the measurement object is determinable, in particular by means of the data processing device. To this end, the latter can evaluate, e.g., model information items, for example CAD information items, wherein these can be read by way of a suitable interface of the data processing device. Further, there is an automated test for the test element by means of the data processing device as to whether there is an applicable measurement rule in a measurement rule set of measurement rules defined in advance. The measurement rule is added to a new measurement strategy or the test element-specific measurement rule of an existing measurement strategy is altered if this measurement rule is applicable to the test element. The new measurement strategy or the altered existing measurement strategy can then be stored by the data processing device and can be made available in retrievable fashion.

It is conceivable for the data processing device to be part of a computing device that serves to control a coordinate measuring machine for the purposes of measuring a measurement object on the basis of a measurement strategy. Then, the measurement of the measurement object can be carried out on the basis of the measurement strategy determined according to the invention.

However, it is also conceivable for the new measurement strategy or the altered existing measurement strategy to be transmitted to the control device of a coordinate measuring machine and then be used by the latter for measuring the measurement object.

The apparatus can further comprise a storage device for storing the measurement rules defined in advance and the at least one test criterion in respect of the applicability thereof.

According to the invention, the measurement rules of the measurement rule set are determined by virtue of a measurement rule and at least one test criterion in respect of the applicability thereof being set for a test element by a user or in (partly) automated fashion, wherein the measurement rule defines at least one parameter for measuring the test element.

Further, the apparatus can comprise at least one input device for inputting measurement rule parameters/information items and for inputting parameters/information items of the test criterion. Further, the apparatus can comprise at least one display device for displaying the information items explained above.

It is further conceivable for the apparatus to comprise at least one device for capturing ambient conditions, for example a temperature sensor, and/or a device for determining a predetermined tolerance and/or a device for determining a measuring device type and/or a device for determining a sensor type and/or a device for determining a build state of the measurement object.

In this context, the apparatus is configured in such a way that a method for determining a measurement strategy for measuring the measurement object in accordance with one of the embodiments explained in this disclosure is implementable by means of the apparatus. Consequently, it is possible to refer to the advantages correspondingly explained above. In this context, the apparatus can be part of a coordinate measuring machine.

Further, a method for measuring a measurement object is described, wherein a measurement strategy for measuring a measurement object in accordance with one of the embodiments explained in this disclosure is determined within the scope of this method, with the measurement of the measurement object then being implemented on the basis of the measurement strategy determined in this way. In particular, the operation of a coordinate measuring machine can be controlled on the basis of measurement parameters defined by the measurement strategy.

Further, a coordinate measuring machine comprising an apparatus for determining a measurement strategy for measuring a measurement object in accordance with one of the embodiments explained in this disclosure is described. This coordinate measuring machine can implement the method, explained above, for measuring the measurement object on the basis of the measurement strategy determined as proposed. Consequently, the coordinate measuring machine can be configured accordingly.

Further proposed is a program which, when executed on or by a computer, prompts the computer to carry out one, a plurality or all of the steps of a method in accordance with one of the embodiments explained in this disclosure for determining a measurement strategy for measuring a measurement object. Alternatively or cumulatively, a program storage medium or computer program product, on or in which the program is stored, in particular in a non-temporary, e.g. permanent, form, is described. Alternatively or cumulatively, a computer that comprises this program storage medium is described. Further alternatively or cumulatively, a signal is described, for example a digital signal, which encodes information items representing the program and which comprises coding means adapted to carry out one, a plurality or all of the steps of the method set out in this disclosure for determining a measurement strategy. The signal can be a physical signal, e.g. an electrical signal, which in particular is generated technically or by machine. The program can also prompt the computer to carry out a use of the measurement object in accordance with the measurement strategy, for example by means of a coordinate measuring machine.

Further, the method for determining a measurement strategy can be a computer-implemented method. For example, one, a plurality or all of the steps of the method may be performed by a computer. One embodiment of the computer-implemented method is the use of the computer for carrying out a data processing method. The computer may for example comprise at least one computing device, in particular lar a processor, and for example at least one storage device, in order to process the data, in particular technically, for example electronically and/or optically. A computer can in this case be any kind of data processing device. A processor can be a semiconductor-based processor.

This advantageously yields a program, by means of which the method explained above with the aforementioned advantages is able to be implemented.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

FIG. 5 is a schematic illustration of a measurement object.

FIG. 6 is an example illustration of a user interface of a strategy assignment module.

FIG. 7 is a schematic illustration of an apparatus according to the principles of the present disclosure.

In the drawings, reference numbers may be reused to identify similar and/or identical elements.

DETAILED DESCRIPTION

Figure 1:
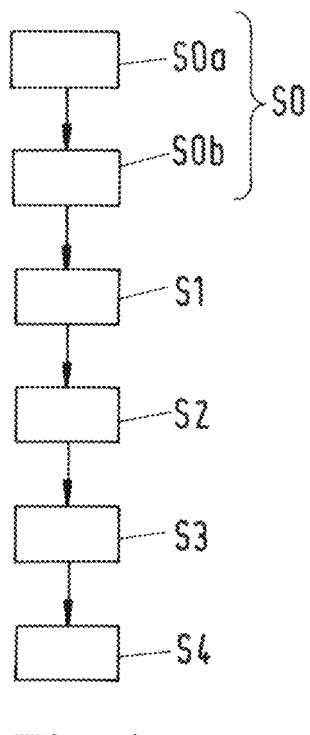
FIG. 1 is a schematic flowchart of a method according to the principles of the present disclosure.

FIG. 1 shows a schematic flowchart of a method according to the invention for determining a measurement strategy for measuring a measurement object 1 (see FIG. 5).

In a test criterion definition step S0a of a definition step S0, the user or a data processing device 2 (see FIG. 7) defines, in (partly) automated fashion, a test criterion in respect of the applicability of a measurement rule for measuring a test element. Then, the measurement rule which is defined when the test criterion is satisfied is defined in a measurement rule definition step S0b, for example also by a user or in (partly) automated fashion. The sequence of test criterion definition step S0a and measurement rule definition step S0b can be repeated to define a plurality of measurement rules and test criteria assigned thereto. It is, however, also possible that the measurement rule is defined first and then the test criterion in respect of the applicability thereof is defined. As outlined before, the definition steps S0a, S0b can be carried out in a measurement object-independent build-up of the measurement rule set.

In particular, the test criterion can be defined by virtue of a property of the test element to be tested, preferably a geometric property, a type of the test and a target variable for the property to satisfy the test criterion being defined. The test criterion is satisfied when the property satisfies the criterion defined by the type of test and the target variable.

In this case, the definition step S0 can be carried out at an earlier time to implementing the method, which consists of the sequence of a first step S1, a second step S2 and a third step S3. The measurement rules defined in the definition step S0 and test criteria in respect of the applicability thereof assigned thereto are stored and form a measurement rule set of measurement rules defined in advance, with corresponding test criteria being assigned thereto. It is also possible that the measurement rule set is extended in the test step S2 as will be explained later.

In a first step S1 of the proposed method, which can also be referred to as determination step, at least one test element of a measurement object 1 (see FIG. 5) is determined.

In the determination step, the test element of the measurement object 1 can be determined in model-based fashion. This has already been explained above. In particular, a CAD model can be loaded, with test elements of the measurement object 1 being extracted from the CAD model. Corresponding methods are known to the person skilled in the art. It is also conceivable to measure the measurement object 1 and then determine test elements of the measurement object 1 on the basis of the measurement results. In this context, a resolution of this measurement can be coarser than the resolution of the measurement with the measurement strategy to be determined as proposed.

In a second step S2, which can also be referred to as test step, a test is carried out as to whether one of the measurement rules of the measurement rule set defined in the definition step S0 is applicable to the test element. To this end, at least one property of the test element, but preferably a plurality of properties thereof, can be determined, wherein a test is then carried out on the basis of the test criteria defined in the definition step S0 as to whether all test criteria assigned to a measurement rule are satisfied. By way of example, this is the case if one or more properties of the test element each correspond to a target property or lie in a predetermined target property range.

If an applicable measurement rule is identified, the latter is added to a new measurement strategy or an existing measurement strategy is altered accordingly in a third step S3, which can also be referred to as addition or change step S3.

If no applicable measurement rule is identified for a test element selected in the determination step in the measurement rule set, a measurement rule not included in the measurement rule set can be determined as the applicable measurement rule, in particular in an automated or partially automated manner. For example, a default measurement rule can be determined as an applicable measurement rule for the test element. Alternatively, an applicable measurement rule may be determined based on at least one similar measurement rule of the existing measurement rule set. Further alternatively, an applicable measurement rule may be determined based on at least one property of a measurement scenario. Further alternatively, an applicable property may be determined by evaluating existing measurement rules. This has been explained previously.

Further, the measurement rule thus determined may be added to the measurement rule set. In this case, as also explained previously, at least one criterion for its applicability can be determined, in particular also in an automated or semi-automated manner. In this case, the set of measurement rules is expanded in a (partially) automated manner.

In a fourth (optional) step S4, a coordinate measuring machine (not illustrated) can then be controlled in such a way that the measurement of the measurement object 1 is carried out in accordance with the accordingly defined measurement strategy, which may comprise one or more measurement rules.

Figure 2:
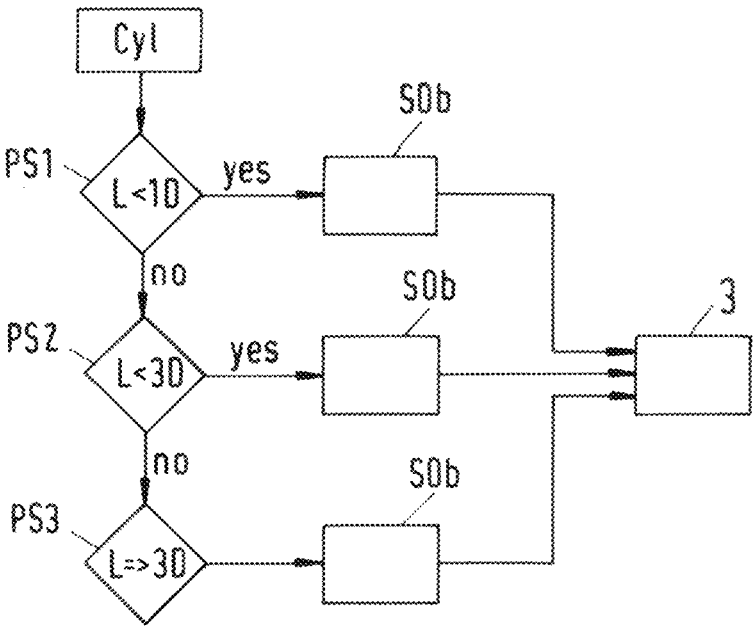
FIG. 2 is a schematic flowchart of a plurality of test criteria for evaluating the same property.

FIG. 2 shows a schematic flowchart which represents the definition of a measurement rule.

In this case, the definition is presented for a cylindrical test element Cyl, i.e., a test element that has a cylinder shape.

What is defined in this context is that a test is carried out in a first test step PS1 as to whether the length L of the cylindrical test element is less than the diameter D of the cylindrical test element. This can be implemented in a test criterion definition step S0a of the definition step S0. Should this be the case, at least one parameter for measuring the test element is defined in accordance with the above-described measurement rule definition step S0b of the definition step S0, for example a speed of a relative movement between measurement object 1 and a sensor of the coordinate measuring machine, which can also be referred to as scanning speed, and the number of measurement points to be generated along a lateral face of the cylinder and an angle range to be measured.

What is further defined is that—if the test criterion in the first test step PS1 is not satisfied—a test is carried out in a second test step PS2 as to whether the length L is less than three times the diameter D of the cylindrical test element. This can be implemented in a test criterion definition step S0a of the corresponding definition step S0. If this test criterion is satisfied, a measurement rule is defined by defining corresponding parameters for the measurement, which may differ from the measurement rule when the test criterion in the first test step PS1 is satisfied. By way of example, a higher relative speed, a greater number of measurement points and a smaller angle range to be measured can be chosen.

What is further defined is that, if the test criterion in the second test step PS2 is not satisfied, a test is carried out in a third test step PS3 as to whether the length L is greater than or equal to three times the diameter D of the cylindrical test element. If this is the case, a corresponding measurement rule is defined by defining parameters for the measurement, wherein, for example, the scanning speed can be defined to be again higher, the number of measurement points can be defined to be yet again greater and the angle range can be defined to be yet again smaller than in the case where the criterion in the second test step PS2 is satisfied.

The definition of the test criteria for the illustrated subsequent steps PS1, PS2, PS3 and the definition of the parameters of the measurement rule in the corresponding measurement rules can be defined by a user in this case, in particular by repeatedly implementing the sequence of test criterion definition step and measurement rule definition step S0a, S0b of the definition step S0. It is also possible for both the criteria and the parameters to be defined in (partly) automated fashion.

The measurement rules defined thus are supplied to a rule generator 7, which generates a correspondingly implementable code for testing the applicability. The rule generator 7 can also generate code means for measuring the measurement object 1 using the parameters defined in the corresponding measurement rules, with these then facilitating the measurement of the measurement object 1 using the coordinate measuring machine which can be controlled in accordance with the code means generated thus.

Figure 3:
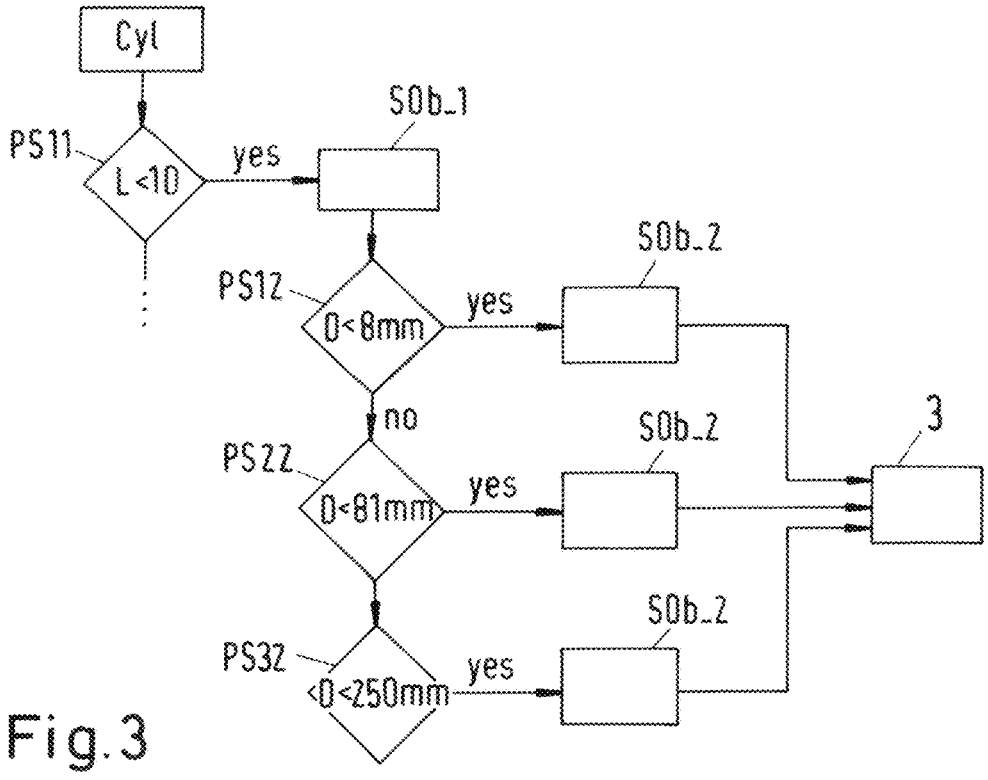
FIG. 3 is a schematic flowchart of testing different properties of a test element.

FIG. 3 shows a further schematic flowchart of defining measurement rules and test criteria, wherein different properties of the measurement object 1 are evaluated in different test steps.

In this case, the definition is presented for a cylindrical test element Cyl, i.e., a test element that has a cylinder shape.

For a first test step PS11 for testing a first property, specifically the ratio of length L to diameter D, it is defined that a test is implemented as to whether the length L of the cylindrical test element is less than the diameter D of the cylindrical test element. If this feature is satisfied, it is defined in a first partial step S0*b*_1 of a measurement rule definition step S0*b* that there is a measurement of the cylindrical test element using two mutually different circular trajectories. Hereinafter, it is defined for a first test step PS12 for testing a further property that a test is carried out as to whether the diameter D is less than 8 mm. If this test criterion has been satisfied, further parameters for measuring the test element, for example the scanning speed, the number of measurement points and the angle range to be measured, are defined in a further partial step S0*b*_2 of the measurement rule definition step S0*b*.

There is further definition that, if the criterion tested in the first test step PS12 is not satisfied, a test is carried out in a second test step PS22 of the further property as to whether the diameter D is less than 81 mm. If this criterion has been satisfied, the specified further parameters are defined in an alternative partial step S0*b*_2 of the measurement rule definition step S0*b*, wherein, however, different values are defined than when the criterion in the first test step PS12 of the further property is satisfied.

There is further definition that, if this criterion tested in the second test step PS22 is not satisfied, a further test criterion is evaluated in a third test step PS32 of the further property, specifically whether the diameter is greater than 250 mm. If this is satisfied, the specified further parameters are defined in an alternative partial step S0*b*_2 of the measurement rule definition step S0*b*, wherein, however, different values are defined than when the criterion in the first test step PS12 of the further property is satisfied and when the criterion in the second test step PS22 of the further property is satisfied.

If the test criterion in the first PS11 of the first property is not satisfied, corresponding further test steps with test criteria are defined, which, when satisfied, then lead to a measurement rule being defined at least in part and/or a definition of test steps with test criteria for testing the further properties being defined.

Consequently, this yields a tree structure, by means of which test criteria and corresponding measurement rules are defined.

Figure 4:
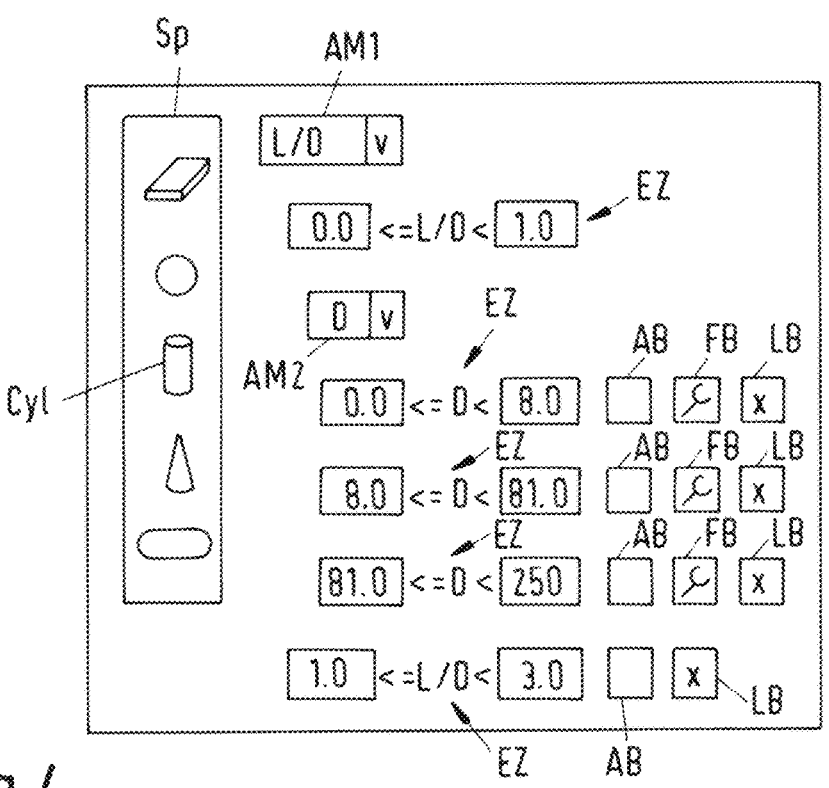
FIG. 4 is an example illustration of a user interface of a strategy editor module.

FIG. 4 shows an example illustration of a user interface of a strategy editor module. Different test elements, which are characterized by geometric properties of the test element, are displayed in a test element column Sp. Thus, a circle, a cylinder Cyl, a cone, a slot and a rectangle are illustrated in this column Sp.

As a result of the graphical representation, these test elements are offered to the user for selection. The user can select a test element, for example from a suitable input device, for example a mouse.

In the example embodiment illustrated in FIG. 4, the assumption is made that a cylinder Cyl was selected as test element.

In the first selection menu AM1, the user can then select the first property to be tested in one or more test criteria, wherein, in the example embodiment illustrated in FIG. 4, a ratio of length L to diameter D of a cylindrical test element is selected in example fashion as property to be tested.

An arrow at the right edge of the selection menu AM1 symbolizes that further properties are offered for selection. In this context, however, only the properties that are test element-specific properties can be offered for selection.

In an indented input line EZ, the user can then quantify values for evaluating the test criterion, by way of which the ratio of length L to diameter D are evaluated. Thus, what is illustrated is that, by inputting corresponding values in the input line EZ, a test is carried out as to whether the ratio of length L to diameter D is greater than or equal to 0 and less than 1.0. Illustrated further is a further input line for quantifying a further test criterion for testing the first property, wherein input of corresponding values defines that a test is carried out as to whether the ratio of length L to diameter D is greater than or equal to 1.0 and less than 3.0.

Further, a further property to be tested can be defined by the user, in particular by means of a second selection menu AM2. In the example embodiment illustrated in FIG. 4, this further property is the diameter D of the cylindrical test element. In accordance with the explanations given above, inputting values into one or more input lines EZ can then define one or more test criteria which require the diameter D for evaluation purposes. In the example embodiment illustrated in FIG. 4, three such test criteria are defined in example fashion, which test criteria can be tested in successive test steps. For the purposes of evaluating a first test criterion, it is defined that there is an evaluation as to whether the diameter is greater than or equal to 0 and less than 8.0 mm. For a second test criterion, it is defined that there is an evaluation as to whether the diameter is greater than or equal to 8.0 mm and less than 81.0 mm. For a third test criterion, it is defined that there is a test as to whether the diameter D is greater than or equal to 81.0 mm and less than 250 mm.

Further illustrated are activation boxes AB in an input line EZ, which activation boxes can be activated by a user, for example by means of a suitable input device, in order to activate the use of the test criterion defined by the values of this input line EZ when testing for applicable measurement rules.

By way of a definition box FB in an input line EZ, the user can call a window for defining the parameters for measuring the test element which are defined when the corresponding test criterion is satisfied. If the user actuates such a definition box FB, for example by actuating a corresponding input device, a new window with the parameters to be defined can open. In this case, the parameters can be test element-specific parameters. It is also conceivable for the parameters to have a specified standard value in the case of a first call.

Further illustrated is a deletion box LB in an input line EZ, wherein the user can delete the test criterion defined by the parameters entered in this line when actuating this deletion box LB.

The user interface illustrated in FIG. 4 can be generated and displayed by a so-called strategy editor module, wherein this module is implemented, for example, by a data processing device 2 (see FIG. 7).

FIG. 5 shows an example illustration of a measurement object 1. The latter consists of a first cylinder Cyl1 and a second cylinder Cy12, which have different diameters and different lengths. These cylinders Cyl1, Cy12 form test elements of the measurement object 1.

FIG. 6 shows an example illustration of a user interface of a strategy assignment module. Using this module, the functionality of which can likewise be provided by means of a data processing device 2 (see FIG. 7), it is possible, for example, to determine the test elements Cyl1, Cy12, for example in model-based fashion. This has already been explained above. To this end, the strategy assignment module, for example, can analyse a CAD model of the measurement object 1 and identify the corresponding test elements Cyl1, Cy12.

FIG. 6 illustrates that the different identified test elements of a measurement object 1 (see FIG. 5) are illustrated in a column Sp. In the example embodiment illustrated in FIG. 6, the first cylinder Cyl1 and the second cylinder Cyl2 are illustrated in example fashion.

By way of the strategy assignment module, it is then possible to test whether an applicable measurement rule exists for each of the test elements Cyl1, Cyl2 in a measurement rule set of measurement rules defined in advance.

In a further column, which can also be referred to as control column RSp, the applicable measurement rules of the measurement rule set of measurement rules defined in advance are represented in line form, which applicable measurement rules are applicable to the first test element, specifically the first cylinder Cyl1, and to the further cylinder Cyl2. Thus, illustrated in a first line Z as a first test element is the first cylinder Cyl1 and the test criterion, which is assigned to the measurement rule identified as applicable. Illustrated in a further line Z as a further test element is the second cylinder Cyl2 and the test criterion, which is assigned to the measurement rule identified as applicable.

It is evident that the measurement rule that arises if the test element has a cylinder shape Cyl and the ratio of length L to diameter D of the cylinder shape Cyl is greater than or equal to 0.0 and less than 1.0 is assigned to the first cylinder Cyl1. The corresponding measurement rule was defined, for example, by the user interface illustrated in FIG. 4, in particular by actuating the definition box FB and inputting the corresponding parameters.

Accordingly, the measurement rule that is applicable if the test element has a cylinder shape Cyl and the ratio of length L to diameter D is between 1.0 and 3.0 is assigned to the second cylinder Cyl2.

Once again, activation boxes AB are illustrated, by the activation of which the user defines that the measurement rule classified as applicable is added to the measurement strategy.

Illustrated further is an overwrite function, which, if activated, for example by a user, leads to the measurement strategy selected in a selection menu AM for different existing measurement strategies being overwritten when an assignment button ZS is actuated. Illustrated further is a creation function, which, if activated, for example by a user, leads to the file name entered in an input field EF being used to store the newly created measurement strategy when the assignment button ZS is actuated.

FIG. 7 shows a schematic block diagram of an apparatus for determining a measurement strategy for measuring a measurement object 1 (see FIG. 5). The apparatus 1 comprises a data processing device 2 and an input device 4. The apparatus 1 likewise comprises a display device 5, in particular for displaying the interfaces illustrated in FIG. 4 and FIG. 6.

By means of the input device 4, a user can input test criteria or parameters required for the evaluation of test criteria and measurement rules or parameters of a measurement rule. By means of the input device 4, the user can also manage already created measurement rules and test criteria, e.g., alter these or add new measurement rules and test criteria or delete existing measurement rules and test criteria.

It is illustrated that the apparatus 1 comprises a storage device 6, in which the measurement rule set of measurement rules defined in advance and the test criteria assigned thereto are stored in order then to be able to retrieve these for the test of applicability.

The term non-transitory computer-readable medium does not encompass transitory electrical or electromagnetic signals propagating through a medium (such as on a carrier wave). Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc). The phrase at least one of A, B, and C should be construed to mean a logical (A OR B OR C), using a non-exclusive logical OR, and should not be construed to mean "at least one of A, at least one of B, and at least one of C."

LIST OF REFERENCE SIGNS

1 Measurement object
2 Data processing device
3 Apparatus
4 Input device
5 Display device
6 Storage device
7 Rule generator
S0 Definition step
S0$a$ Test criterion definition step
S0$b$ Measurement rule definition step
S0$b$_1 First partial step of the measurement rule definition step
S0$b$_2 Further partial step of the measurement rule definition step
S1 Determination step
S2 Test step
S3 Addition/change step
S4 Measurement step
Cyl Cylinder, cylinder shape
P51, PS2, PS3 Test step
PS11 Test step
PS12, PS22, PS32 Test step
L Length
D Diameter
Sp Column
AM, AM1 Selection menu
AB Activation box
FB Definition box
LB Deletion box
AM2 Selection menu
ZS Assignment button
EF Input field
RSp Control column
Cyl1 First cylinder
Cyl2 Further cylinder
EZ Input line
Z Line

What is claimed is:

1. A method of measuring a measurement object using a coordinate measuring machine, the method comprising:
    identifying a measurement rule set including one or more measurement rules, wherein each measurement rule of the measurement rule set:
        (i) includes at least one respective rule-specific test criterion corresponding to the measurement rule, wherein the at least one respective rule-specific test criterion is used to assess correspondence of the measurement rule to a respective test element, and wherein the respective test element is associated with a geometric element of the measurement object that is measured by the coordinate measuring machine, (ii) defines a set of parameters for measuring the respective test element, wherein the set of parameters includes:
  a speed of a relative movement between the measurement object and a sensor of the coordinate measuring machine, and
  at least one of:
    a number of measurement points to be generated by the sensor, and
    a number of measurement trajectories to be traversed by the sensor, and
(iii) controls operation of the coordinate measuring machine to measure the respective test element;
determining a test element of the measurement object;
executing an automated test that evaluates the test element with respect to at least one measurement rule of the measurement rule set to determine whether an applicable measurement rule for the test element is present in the measurement rule set, wherein evaluating the test element with respect to a selected measurement rule includes comparing the test element to the at least one respective rule-specific test criterion of the selected measurement rule;
in response to the automated test determining that the applicable measurement rule is absent from the measurement rule set:
  selecting a similar measurement rule from the measurement rule set,
  determining a new measurement rule based on the similar measurement rule, and
  using the new measurement rule as the applicable measurement rule;
generating a different measurement strategy for the coordinate measuring machine by at least one of:
  adding the applicable measurement rule to a new measurement strategy to generate the different measurement strategy, and
  altering a measurement rule of an existing measurement strategy based on the applicable measurement rule to generate the different measurement strategy; and
after executing the automated test and generating the different measurement strategy, controlling the coordinate measuring machine to measure the measurement object according to the different measurement strategy, wherein operation of the coordinate measuring machine according to the different measurement strategy is altered in comparison with the existing measurement strategy.

2. The method of claim 1 wherein, for a selected rule of the measurement rule set, the at least one respective rule-specific test criterion is defined in such a way that comparing the test element to the at least one respective rule-specific test criterion evaluates at least one of:
a geometric property of the test element;
a variable dependent on a geometric property of the test element;
an ambient condition;
a predetermined tolerance;
a measuring device type;
a sensor type;
a build state of the measurement object; and
a measurement quality of a preceding measurement of the measurement object.

3. The method of claim 2 further comprising, in order to test applicable measurement rules, determining at least one of:

the geometric property of the test element;
the variable dependent on a geometric property of the test element;
the ambient condition;
the predetermined tolerance;
the measuring device type;
the sensor type;
the build state of the measurement object; and
the measurement quality of a preceding measurement.

4. The method of claim 1 wherein:
test element-specific properties are respectively assigned to different test elements; and
the at least one respective rule-specific test criterion is defined for a test element in such a way that only at least one test element-specific property of the test element or a variable dependent thereon is evaluated during a test of the at least one respective rule-specific test criterion.

5. The method of claim 1 wherein:
at least two respective rule-specific test criteria, which are to be tested in at least two successive test steps, are defined for testing the applicability of a measurement rule for a test element, and
the method further comprises, in response to a conflict between the measurement rules resulting from the at least two successive test steps, adjusting the different measurement strategy to avoid the conflict between the measurement rules.

6. The method of claim 5 wherein the at least one respective rule-specific test criterion to be tested in a subsequent test step is defined based on at least one of:
at least one already tested respective rule-specific test criterion, or
a result of the test of at least one already tested respective rule-specific test criterion.

7. The method of claim 1 wherein the test element is at least one of:
a cylinder shape;
a circle shape;
a cone shape;
a sphere shape;
a torus shape;
a two-dimensional straight line;
a slot;
a plane;
a plane of symmetry; and
a rectangle shape.

8. The method of claim 1 wherein a property of the test element is at least one of:
a diameter variable;
a further diameter variable;
a length variable;
a width variable;
a ratio of length to diameter;
a ratio of length to width;
a distance variable;
an angle variable;
an internal or external identifier;
membership of a test feature group; and
membership of a test feature type.

9. The method of claim 1 wherein:
the test as to whether there is an applicable measurement rule in the measurement rule set is carried out based on at least two different properties of the test element, with the different properties being tested sequentially, and
the property to be tested in a subsequent test step is determined based on at least one of:

at least one already tested property, or a result of the test of at least one already tested property.

10. The method of claim 1 wherein a test element is determined in model-based fashion.

11. The method of claim 1 wherein the measurement object is measured and the test element is determined by evaluating measurement results.

12. The method of claim 1 further comprising:

determining a measurement quality of the different measurement strategy based on measurement of the measurement object in accordance with the different measurement strategy;

determining a test element of the measurement object;

implementing an automated test based on the measurement quality, wherein the automated test determines whether a respective measurement rule for the test element exists in a predefined measurement rule set of measurement rules; and in response to the respective measurement rule being applicable to the test element, altering a test element-specific measurement rule of the different measurement strategy.

13. An apparatus for determining a measurement strategy for measuring a measurement object using a coordinate measuring machine, the apparatus comprising:

a storage device configured to store instructions; and a data processing device configured to execute the instructions, wherein the instructions include:

identifying a measurement rule set including one or more measurement rules, wherein each measurement rule of the measurement rule set:

(i) includes at least one respective rule-specific test criterion corresponding to the measurement rule, wherein the at least one respective rule-specific test criterion is used to assess correspondence of the measurement rule to a respective test element, wherein the respective test element is associated with a geometric element of the measurement object that is measured by the coordinate measuring machine, (ii) defines a set of parameters for measuring the respective test element, wherein the set of parameters includes:

a speed of a relative movement between the measurement object and a sensor of the coordinate measuring machine, and at least one of a number of measurement points to be generated by the sensor, and a number of measurement trajectories to be traversed by the sensor, and (iii) controls operation of the coordinate measuring machine to measure the respective test element;

determining a test element of the measurement object;

executing an automated test that evaluates the test element with respect to at least one measurement rule of the measurement rule set to determine whether an applicable measurement rule for the test element is present in the measurement rule set, wherein evaluating the test element with respect to a selected measurement rule includes comparing the test element to the at least one respective rule-specific test criterion of the selected measurement rule;

in response to the automated test determining that the applicable measurement rule is absent from the measurement rule set:

selecting a similar measurement rule from the measurement rule set, determining a new measurement rule based on the similar measurement rule, and using the new measurement rule as the applicable measurement rule;

generating a different measurement strategy for the coordinate measuring machine by at least one of:

adding the applicable measurement rule to a new measurement strategy to generate the different measurement strategy, and altering a measurement rule of an existing measurement strategy based on the applicable measurement rule to generate the different measurement strategy; and after executing the automated test and generating the different measurement strategy, controlling the coordinate measuring machine to measure the measurement object according to the different measurement strategy, wherein operation of the coordinate measuring machine according to the different measurement strategy is altered in comparison with the existing measurement strategy.

14. A non-transitory computer-readable medium comprising instructions for measuring a measurement object using a coordinate measuring machine, the instructions including:

identifying a measurement rule set including one or more measurement rules, wherein each measurement rule of the measurement rule set:

(i) includes at least one respective rule-specific test criterion corresponding to the measurement rule, wherein the at least one respective rule-specific test criterion is used to assess correspondence of the measurement rule to a respective test element, wherein the respective test element is associated with a geometric element of the measurement object that is measured by the coordinate measuring machine, (ii) defines a set of parameters for measuring the respective test element, wherein the set of parameters includes:

a speed of a relative movement between the measurement object and a sensor of the coordinate measuring machine, and at least one of:

a number of measurement points to be generated by the sensor, and a number of measurement trajectories to be traversed by the sensor, and (iii) controls operation of the coordinate measuring machine to measure the respective test element;

determining a test element of a measurement object;

executing an automated test that evaluates the test element with respect to at least one measurement rule of the measurement rule set to determine whether an applicable measurement rule for the test element is present in the measurement rule set, wherein evaluating the test element with respect to a selected measurement rule includes comparing the test element to the at least one respective rule-specific test criterion of the selected measurement rule;

in response to the automated test determining that the applicable measurement rule is absent from the measurement rule set:

selecting a similar measurement rule from the measurement rule set, determining a new measurement rule based on the similar measurement rule, and using the new measurement rule as the applicable measurement rule;

generating a different measurement strategy for the coordinate measuring machine by at least one of:

adding the applicable measurement rule to a new measurement strategy to generate the different measurement strategy, and altering a measurement rule of an existing measurement strategy based on the applicable measurement rule to generate the different measurement strategy; and after executing the automated test and generating the different measurement strategy, controlling the coordinate measuring machine to measure the measurement object according to the different measurement strategy, wherein operation of the coordinate measuring machine according to the different measurement strategy is altered in comparison with the existing measurement strategy.

15. The method of claim 1 wherein:

a similarity measure between the test element and a set of test elements to which existing measurement rules of the measurement set are assigned is evaluated; and the applicable measurement rule is determined as the measurement rule assigned to a selected test element of the set of test elements for which the similarity measure is greater than a predetermined threshold value or for which the similarity measure is greatest.

16. The method of claim 1 wherein the generating the different measurement strategy is performed in an automated manner independent of input from a user.

17. The method of claim 1 further comprising:

presenting information about the applicable measurement rule to a user; and receiving input from the user regarding the applicable measurement rule, wherein the generating the different measurement strategy is performed only in response to the input indicating user approval of the applicable measurement rule.

18. The method of claim 1 wherein the automated test determines that the applicable measurement rule is absent from the measurement rule set in response to the test element not satisfying the at least one respective rule-specific test criterion of any measurement rule of the measurement rule set.

19. The method of claim 1 wherein executing an automated test to determine whether an applicable measurement rule for the test element is present in the measurement rule set includes comparing the test element to the at least one respective rule-specific test criterion of each measurement rule of the measurement rule set.

20. The method of claim 1 wherein the measurement rule set and the at least one respective rule-specific test criterion are stored in a database on a storage device.

21. The method of claim 1 wherein the at least one respective rule-specific test criterion is an ambient temperature, and the measurement rule is applicable for the test element if the ambient temperature corresponds to a predetermined temperature or lies in a predetermined temperature range.

22. The method of claim 1 wherein:

the at least one respective rule-specific test criterion is a predetermined measurement quality, and the measurement rule is applicable for the test element if the predetermined measurement quality is greater than or equal to a target minimum measurement quality.

23. The method of claim 1 further comprising:

supplying the measurement rule set to a rule generator; and generating, by the rule generator, implementable code for testing the applicability of each measurement rule of the measurement rule set to the test element.

24. The method of claim 1 wherein the set of parameters includes the number of measurement trajectories to be traversed by the sensor.

25. The method of claim 1 wherein the set of parameters includes a position of measurement trajectories to be traversed by the sensor.

26. The method of claim 1 wherein the automated test is evaluation-based.

* * * * *